(12) United States Patent  (10) Patent No.: US 9,030,571 B2
Talvala                   (45) Date of Patent:      May 12, 2015

(54) ABSTRACT CAMERA PIPELINE FOR UNIFORM CROSS-DEVICE CONTROL OF IMAGE CAPTURE AND PROCESSING

(75) Inventor: Eino-Ville Talvala, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 8 days.

(21) Appl. No.: 13/546,600

(22) Filed: Jul. 11, 2012

(65) Prior Publication Data

US 2014/0016004 A1   Jan. 16, 2014

(51) Int. Cl.
    H04N 5/228  (2006.01)
    H04N 9/73   (2006.01)
    H04N 5/232  (2006.01)
    H04N 5/217  (2011.01)
    H04N 7/14   (2006.01)

(52) U.S. Cl.
    CPC .......... *H04N 5/232* (2013.01); *H04N 5/217* (2013.01); *H04N 2007/145* (2013.01)

(58) Field of Classification Search
    None
    See application file for complete search history.

(56) References Cited

U.S. PATENT DOCUMENTS

| 7,798,408 B2 | 9/2010 | Blumer et al. |
| 2006/0195786 A1 | 8/2006 | Stoen et al. |
| 2007/0074266 A1* | 3/2007 | Raveendran et al. ......... 725/135 |
| 2010/0157102 A1* | 6/2010 | Kurokawa ................. 348/240.1 |
| 2011/0078706 A1 | 3/2011 | Lawson et al. |
| 2011/0267478 A1 | 11/2011 | Jacobs |
| 2011/0298944 A1* | 12/2011 | Kuo et al. .................. 348/223.1 |
| 2012/0002082 A1* | 1/2012 | Johnson et al. .............. 348/234 |
| 2012/0008002 A1* | 1/2012 | Bigioi et al. ............... 348/222.1 |
| 2012/0050567 A1* | 3/2012 | Cote et al. .................. 348/224.1 |
| 2013/0308707 A1* | 11/2013 | Raveendran et al. .... 375/240.24 |
| 2013/0322753 A1* | 12/2013 | Lim et al. ..................... 382/167 |

FOREIGN PATENT DOCUMENTS

EP    1978724    10/2008

OTHER PUBLICATIONS

PCT Search Report and Written Opinion; PCT Application No. PCT/US2013/050137; EPO Searching Authority; Oct. 23, 2013.
Eino-Ville Aleksi Talvala; the Frankencamera: Building a Programmable Camera for Computational Photography; Dissertation Submitted to the Department of Electrical Engineering and the Committee on Graduate Studies of Stanford University; Feb. 2011.

* cited by examiner

*Primary Examiner* — Lin Ye
*Assistant Examiner* — John H Morehad, III
(74) *Attorney, Agent, or Firm* — Gottlieb, Rackman & Reisman, PC

(57) ABSTRACT

A system for acquiring digital images for a device having an integrated camera includes an Application Program Interface (API). The API is adapted to receive preprocessing and other instructions from a discrete application operating on the device. The API is also adapted to process multiple image capture requests using a pipeline configuration.

10 Claims, 3 Drawing Sheets

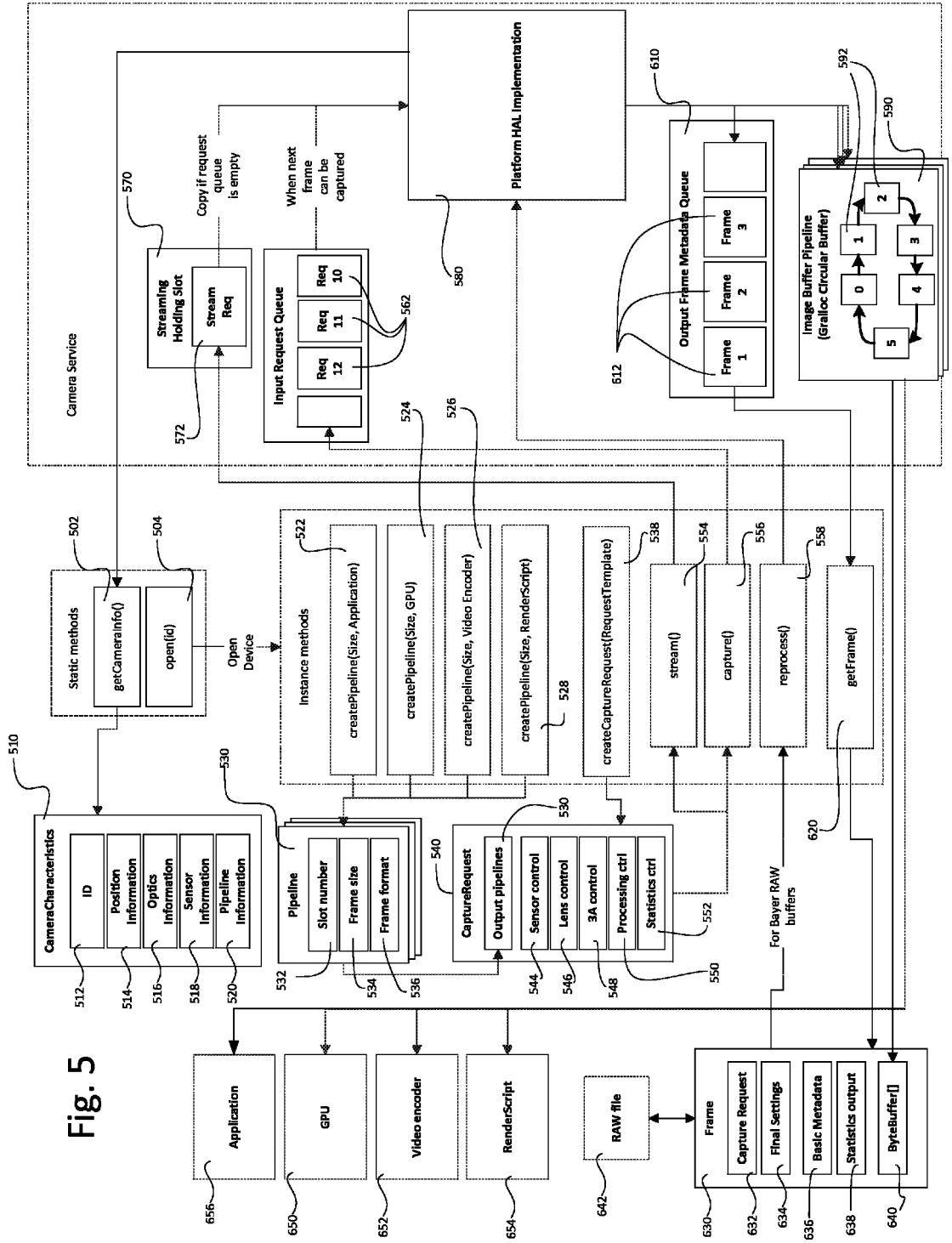

US 9,030,571 B2

ABSTRACT CAMERA PIPELINE FOR UNIFORM CROSS-DEVICE CONTROL OF IMAGE CAPTURE AND PROCESSING

FIELD

The present application relates to a method and system for acquiring a digital image in a device. Specifically, the disclosure concerns an application programming interface (API) that allows discrete programs installed on a device to control a digital image sensor on the same device.

BACKGROUND

Many modern devices rely on an operating system from one supplier and hardware from one or multiple other suppliers. Further, the device may include additional programs or applications from third suppliers.

On the devices, the operating system includes application programming interfaces (APIs) that govern the operating system or application control of the hardware (e.g., display, touch screen, audio output, network connection, digital image sensor, etc.). These APIs provide universal instruction criteria for performing functions on the hardware.

Current camera APIs may include high level criteria such as an instruction for acquiring an image and an instruction for firing a flash. Additional low level functionality is not present in the API and thus, the applications have limited control over the digital image sensor. It would be advantageous to provide an API with low level functionality, but that is compatible with a larger number of independent hardware configurations.

SUMMARY

A system for acquiring digital images for a device having an integrated camera includes an Application Program Interface (API). The API is adapted to receive instructions from a discrete application operating on the device. The instructions may include image capture instructions and image data preprocessing instructions. The API may also be adapted to process multiple image capture instructions using a pipeline configuration, where different elements of the process are performed on a first image capture request while other elements of the process are performed on a second image capture request. After preprocessing, the system outputs a preprocessed image back to the discrete application, and/or to memory and the GPU.

The instructions received by the API from the discrete application allow the discrete application to customize the capture and preprocessing of the image data that the API outputs.

Additional features of the disclosure will be apparent from the following detailed description, which illustrates, by way of example, features of the disclosure.

BRIEF DESCRIPTION OF THE DRAWINGS

The above-described and other advantages and features of the present disclosure will be appreciated and understood by those skilled in the art from the following detailed description and drawings of which.

FIG. 5 is another diagram view of an example of a system for acquiring an image of the present disclosure.

DETAILED DESCRIPTION OF THE DISCLOSURE

Figure 1:
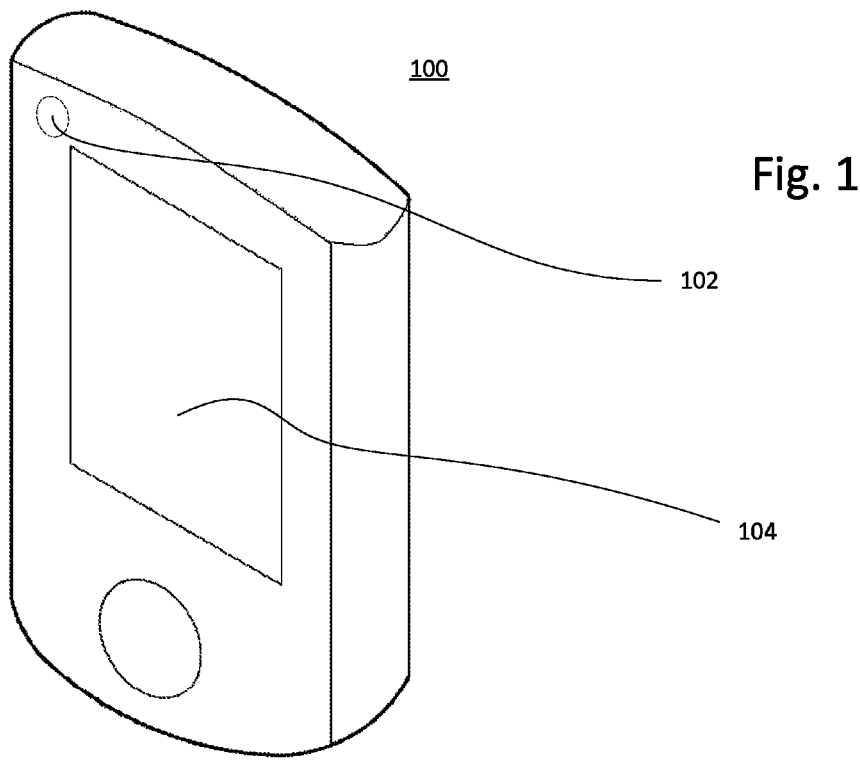
FIG. 1 is a perspective view of an example of a system for acquiring an image of the present disclosure.

The present disclosure provides an improved API for a camera and sensor. As illustrated in FIG. 1, the API (sometimes referred to an "interface") is preferably designed for a mobile device 100, though it may be used on any device having a camera 102. The API is configured to control a class of hardware configurations based on an instruction set.

The device 100 is assumed to include an Operating System (OS) 210 and a Discrete Application 220. The OS 210 coordinates the functions of the Application 220, an integrated Camera 202 (the terms camera and sensor may be used interchangeably throughout this written description), and a Display 204. The OS 210 further includes a Camera API 212 and a Display API 214, where the Camera API 212 communicates with the Camera 202, and the Display API 214 communicates with the Display 204.

Preproccessing

Whenever an image sensor (of a camera) acquires an image or video (hereafter "image" may be used to include both images and video) the initial sensor data must be preprocessed before it can be displayed. The initial sensor data contains noise, edge shadows, pixilation and other characterizes that leave the image less recognizable to the human eye. Accordingly, the initial sensor data must be adjusted using preprocessing algorithms (e.g., demosaic, noise reduction, hot pixel correction, white balance adjustment, contrast adjustment, edge enhancement). The present disclosure allows for greater flexibility in the preprocessing of this data in the creation of images.

The disclosure will provide a uniform set of instructions whereby a discrete Application 312 (i.e., an application functioning in conjunction with, but independently from, the Operating System) functioning on a System 300 is able to manipulate a Preprocessor 330. In particular, the System 300 allows the Application 312 to control the Preprocessor 330 that is included in digital image acquisition. For example, the application subsequently installed on the device 100 may provide a new algorithm for previously identified preprocessing functions. The System 300 is also capable of operating on a class of hardware configurations, as opposed to being designed for a specific image sensor and processor.

Figure 3:
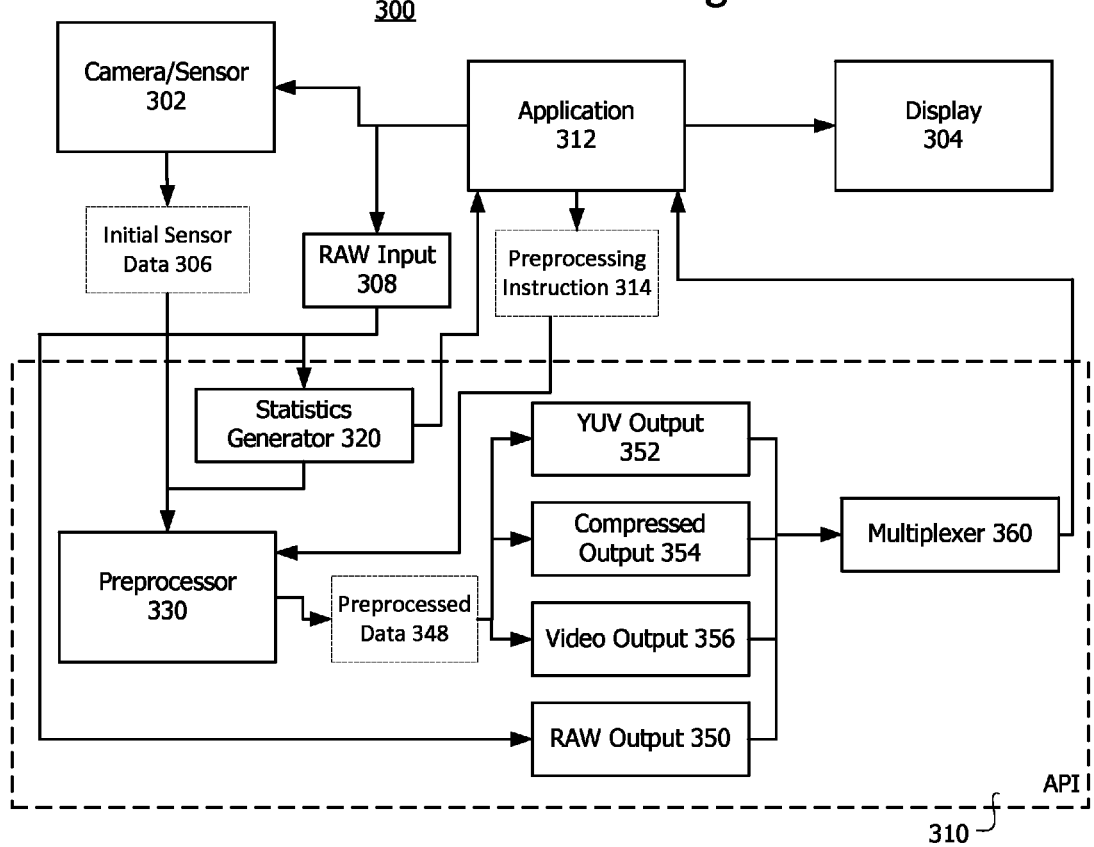
FIG. 3 is another diagram view of an example of a system for acquiring an image of the present disclosure.

As illustrated in FIG. 3, an image acquisition system 300 obtains Initial Sensor Data 306 from either the Sensor 302 or a Raw Input 308, where the Sensor 302 and Raw Input 308 may be initiated by an acquire image instruction. The Raw Input 308 includes previously obtained sensor data that has been stored in memory. The Initial Sensor data 306 is conveyed to the Statistics Generator 320 and the Raw Output 350. The Raw Output 350 progresses to a Multiplexer 360, which is discussed below.

The Statistics Generator 320 retrieves statistics such as date, resolution, flash, and other information relating to the image being acquired. In one example, the Statistics Generator 320 calculates a histogram and outputs the histogram to the Application.

Figure 4:
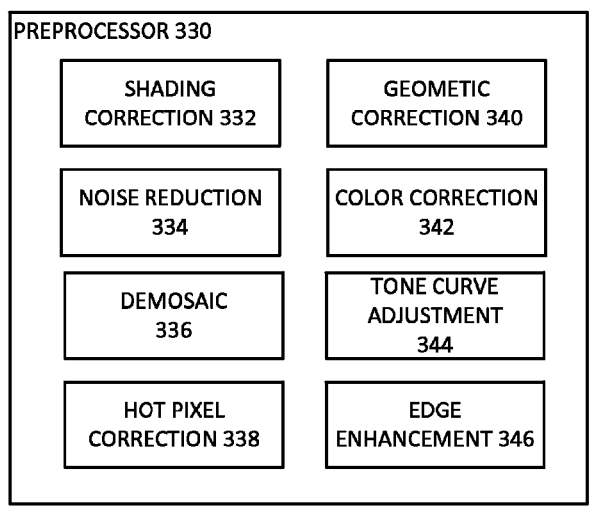
FIG. 4 is a diagram view of the preprocessor of an example of a system for acquiring an image of the present disclosure.

After the statistics are generated, the Raw Input 308 is processed by the Preprocessor 330 based on the Preprocessing Instruction 314 from the Application 312 as illustrated as FIG. 4. As discussed above, the Preprocessor is adapted to perform: shading correction 332, noise reduction 334, demosaic 336, hot pixel correction 338, geometric correction 340, color correction 342, tone curve adjustment 344, and edge enhancement 346. The order of these functions may be predetermined by the Preprocessor 330 or may be controlled by the Preprocessing Instruction 314. The system may include various known algorithms for the preprocessing functions 332, 334, 336, 338, 340, 342, 344, 346, though the system may also accept preprocessing algorithms from the Application 312 as part of the preprocessing instruction 314. Further, an Application's 312 Preprocessing Instruction 314 may include disabling one or more of the preprocessing functions 332, 334, 336, 338, 340, 342, 344, 346.

The newly Preprocessed Data 348 is converted and output in the form of a YUV Raw Output 352, a Compressed Output 354, and a Video Output 356. The YUV Raw Output 352, the Compressed Output 354, and the Video Output 356 are combined with the Raw Output 350 by the Multiplexer 360 and then output from the API 310 to the Application 312. The Application 312 may then further process the data (using any or all of the formats) and/or display an image based on the output of the Multiplexer 360.

Pipeline

Figure 2:
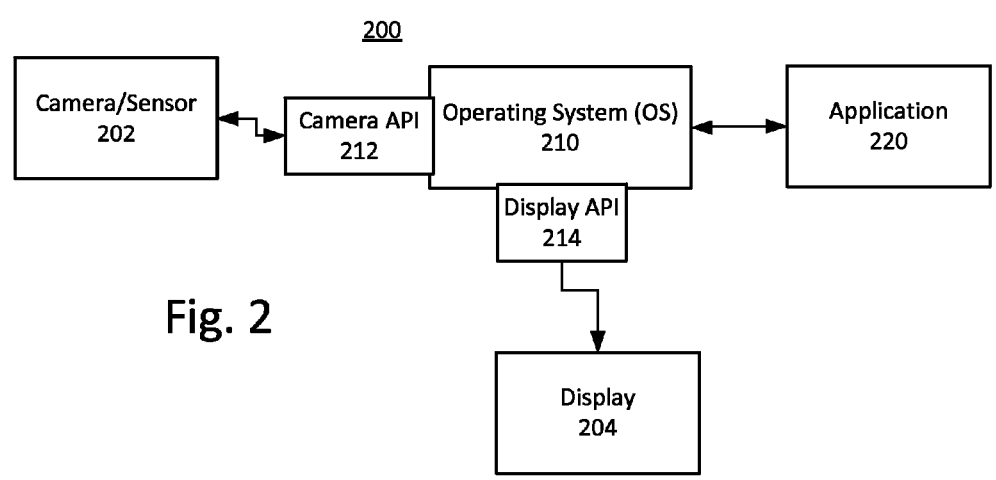
FIG. 2 is a diagram view of an example of a system for acquiring an image of the present disclosure.

As illustrated in FIG. 5 in complement with FIG. 2, there is provided an API 500 for acquiring images. The API 500 may be initiated by getCameraInfo( ) 502 and open(ID) 504 commands, which are provided by the OS 210 to the System 500 (corresponding in part to the API 212). The getCameraInfo( ) 502 command retrieves Camera Characteristics 510, preferably including an ID 512, position information 514, optics information 516, sensor information 518, and pipeline information 520.

ID 512 includes the model name and number of the camera 202. Position information 514 relates to the position of the sensor on the device (may apply to multi-camera stereoscopic image acquisition applications). Optics information 516 includes fixed information about the camera 202 such as focal length and aperture range. Sensor information 518 includes fixed information about the sensor 202 such as maximum resolution, type (e.g., CMOS, CCD, etc.), and dimensions. Pipeline information 520 includes available processing categories, (e.g., portrait, sports, flash, video, landscape, etc.).

The Open(ID) command 504 initiates the API 500 and allows creation of a plurality of pipelines 530 (four createPipeline( ) functions 522, 524, 526, 528 are illustrated in FIG. 5) and a Capture Request 540 (relating to createCaptureRequest( ) 538). The createPipeline( ) functions 522, 524, 526, 528 and the createCaptureRequest( ) function 538 are all instances of methods called from the System 500. Each pipeline 530 is a set of data processing elements connected in series, where the output of one element is the input of the next element; one element of a first pipeline 530 may be executed in parallel with a different element of a second pipeline 530.

Each of the plurality of Pipelines 530 is allocated a slot number 532, a frame size 534, and a frame format 536. The Capture Request 540 includes criteria for sensor control 544, lens control 546, 3A control (auto-exposure, auto-focus, auto-white balance) 548, processing control 550, and statistics control 552. The processing control criterion 550 may include the Preprocessing Instruction 314 described above in relation to FIGS. 3 and 4. The Capture Request 540 forms a plurality of output pipelines 530 containing the Capture Request information 544, 546, 548, 550, and 552 relating to each output pipeline 530.

An output pipeline 540 is forwarded to an Input Request Queue 560 and/or a Streaming Holding Slot 570 in response to the stream( ) method 554 or the capture( ) method 556, respectively. The Input Request Queue 560 contains a plurality of Requests 562 and the Stream Holding Slot 570 contains a Stream Request 572. The Input Request Queue 560 and the Stream Holding Slot 570 may also be populated by a reprocess( ) method 558. The reprocess( ) method 558 relates to data coming from memory as opposed to the sensor.

The Input Request Queue 560 includes a plurality of spaces holding an ordered list of requests 562 to capture an image having the Capture Request 538 details. Once the image sensor 580 (referred to in FIG. 5 as the Platform Hardware Abstraction Layer (HAL) Implementation) has acquired an image, the next request 562 in the Input Request Queue 560 is passed to the sensor 580. The sensor 580 not only acquires data, but also preprocesses the data to create the RAW image 592 in accordance with the preprocessing instruction 314.

If a new request 562 is not ready in the Input Request Queue 560, a stream request 572 is acquired from the Streaming Holding Slot 570. The Streaming Holding Slot 570 provides a back-up request that may be lower in memory requirements. In many instances, the Streaming Holding Slot 570 is used for providing a preview image on the display 104 of the device 100. In such a scenario, the System 500 avoids generating continuous requests 562 to maintain a continuous preview image. In other instances, the Streaming Holding slot 570 is used to prevent a continuous flow of redundant Requests 562.

In addition to the Input Request Queue 560 and the Streaming Holding Slot 570, the sensor 580 may receive a request to Reprocess 558. The request to Reprocess 558 relates to a stored RAW File 642 from a previous image acquisition that is now being reprocessed into a viewable image.

After the sensor 580 acquires or processes an image 592, the sensor 580 outputs an image 592 and metadata 612. The image is output to an Image Buffer Pipeline 590 (which relies on the Gralloc Circular Buffer where a limited number of large memory locations are allocated to storing image data and the locations are cycled in a circular manner), where there is a separate Buffer 590 for each pipeline 530. The metadata 612 is output to an Output Frame Metadata Queue, which contains a plurality of metadata 612. Once requested by getFrame( ) 620, both the RAW Image 592 and the metadata 612 are moved to a Frame 630. The Frame 630 consolidates an image 592 with its associated Capture Request 632, Final Settings 634, Basic Metadata 636, Statistical Output 638, and ByteBuffer 640. The ByteBuffer 640 holds the image 592. The Frame 630 is saved as a RAW file 642. Additionally, the RAW image 592 may be sent to the device GPU 650, Video Encoder 652, RenderScript (3D rendering) 654, and or the Application 656. When the RAW image 592 is sent to the device GPU 650, the Video Encoder 652, and/or RenderScript 654, the RAW image 592 is processed (e.g., by JPEG, YUV, etc.) into a viewable format and displayed.

The accompanying drawings illustrate examples of an API and its hardware environment. Other types and styles are possible, and the drawings are not intended to be limiting in that regard. Thus, although the description above and accompanying drawings contains much specificity, the details provided should not be construed as limiting the scope of the examples but merely as providing illustrations of some of the presently preferred examples. The drawings and the description are not to be taken as restrictive on the scope of the examples and are understood as broad and general teachings in accordance with the present disclosure. While the present examples of the disclosure have been described using specific terms, such description is for present illustrative purposes only, and it is to be understood that modifications and variations to such examples, including but not limited to the substitutions of equivalent features, materials, or parts, and the reversal of various features thereof, may be practiced by those of ordinary skill in the art without departing from the spirit and scope of the disclosure.

The invention claimed is:

1. A system for acquiring a digital image for a device having an integrated camera, the system comprising:
   an image sensor adapted to acquire initial sensor data;
   an image acquisition interface adapted to control the image sensor and preprocess the initial sensor data said image acquisition interface including a preprocessor having a plurality of preprocessing modules;
   wherein the image acquisition interface is configured to activate a first subset of said plurality of preprocessing modules in response to a first instruction set and to activate a second subset of said plurality of preprocessing modules in response to a second instruction set to generate respective first and second preprocessed images in parallel;
   a discrete application operating said image acquisition interface and receiving said first and second preprocessed images;
   wherein the preprocessing modules include modules for shading correction, noise correction, demosaic, hot pixel correction, geometric correction, color correction, tone curve correction, tone curve adjustment and edge enhancement.

2. The system of claim 1, wherein the image acquisition interface is adapted to provide a histogram to the discrete application.

3. A system for acquiring a digital image from a camera generating sensor data, the system comprising:
   a discrete application receiving a first and a second request for images from the camera, said discrete application generating respective a first and a second preprocessing instruction; and
   an interface adapted to receive preprocessing instructions from discrete application, said interface including a plurality of preprocessing modules include modules for shading correction, noise correction, demosaic, hot pixel correction, geometric correction, color correction, tone curve correction, tone curve adjustment and edge enhancement each module performing a respective preprocessing function on said sensor data, said interface being adapted to activate a first subset of modules in response to said first preprocessing instruction to generate a first preprocessed image, and to activate a second subset of modules in response to said second preprocessing instruction to generate a second preprocessed image.

4. The system of claim 3, wherein the first preprocessed image and the second preprocessed image are output to the discrete application.

5. The system of claim 3, wherein each of said preprocessing instructions is passed through one of an input request queue and a streaming holding slot; wherein the streaming holding slot is accessed when the input request queue is empty.

6. The system of claim 3, wherein said requests are selected from the group consisting of: a stream request, a capture request, and a reprocess request.

7. The system of claim 4 wherein said first and second preprocessed images are generated in parallel.

8. The system of claim 3 wherein said interface further includes a multiplexer adapted to receive said first and second images to said discrete application.

9. The system of claim 3 wherein said first and second preprocessed images are in one of a group of formats selected from a raw, a YUV, a compressed, and a video output.

10. The system of claim 3 wherein said first and second preprocessed images have different formats.

* * * * *